Figure 1:
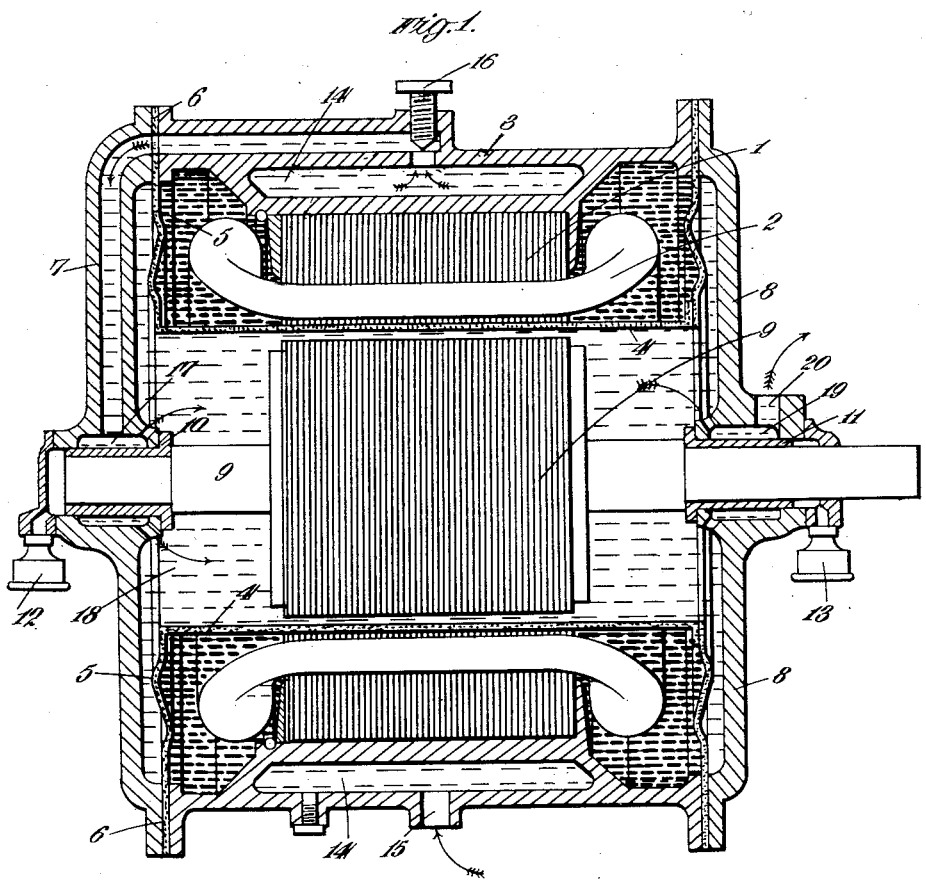

T. L. R. COOPER.
ELECTRIC MOTOR.
APPLICATION FILED FEB. 20, 1918.

1,269,909.

Patented June 18, 1918.
2 SHEETS—SHEET 1.

Inventor:
Thomas Lancelot Reed Cooper
By Attys

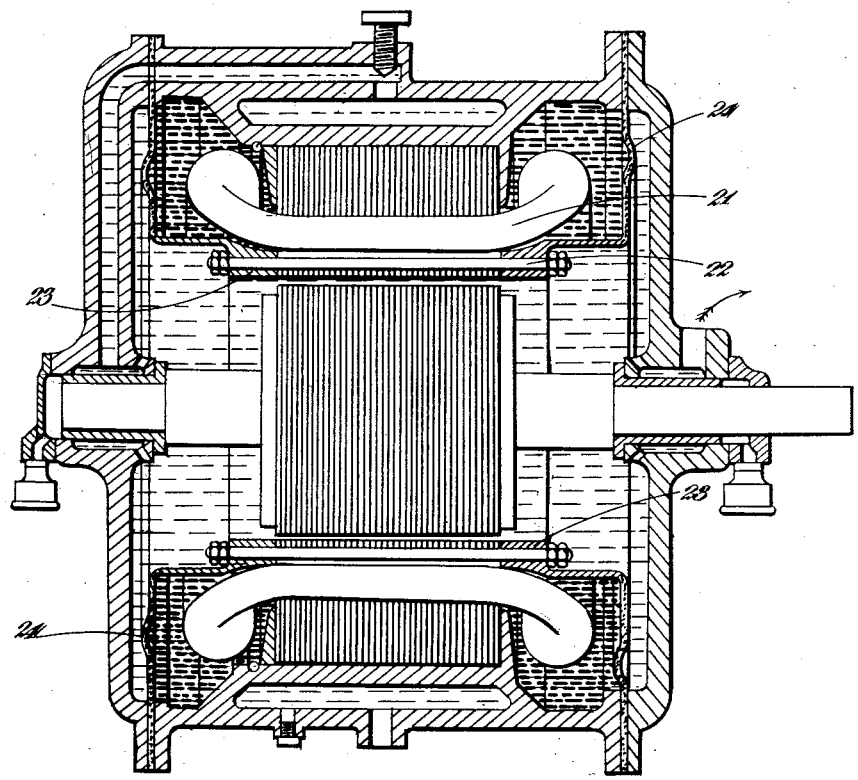

UNITED STATES PATENT OFFICE.

THOMAS LANCELOT REED COOPER, OF LONDON, ENGLAND.

ELECTRIC MOTOR.

1,269,909.　　　　　Specification of Letters Patent.　　Patented June 18, 1918.

Application filed February 20, 1918. Serial No. 218,380.

*To all whom it may concern:*

Be it known that I, THOMAS LANCELOT REED COOPER, a subject of the King of Great Britain and Ireland, residing in London, England, have invented certain new and useful Improvements in or Relating to Electric Motors, of which the following is a specification.

This invention relates to electric motors designed to work when submerged under water or under similar conditions. More particularly it refers to a motor of this description of the squirrel cage induction type.

The object of the invention is to provide an improved motor of this kind in which the stator windings are contained in a watertight chamber and immersed under suitable insulating fluid such as oil while the rotor may be in free communication with the external medium in which the machine is immersed or may be separately inclosed and supplied with water.

Such a machine may have the stator wound in the ordinary way and special insulating material for the windings may in some cases be unnecessary owing to the oil immersion of the whole stator and owing to the fact that the oil itself forms an insulating medium and would sufficiently insulate the coil conductor windings covered with cotton or other separating material.

The stator with its windings may be inclosed in any convenient way to form the oil insulating chamber, for example, by means of a flanged tube of any suitable material that would interfere as little as possible with the induction between the stator and bars of the rotor, the periphery of the flange being secured in any suitable manner, for example, by a coned joint to the main stator casing of the machine at one end and the other end of the tube being fastened to an end plate attached to the casing of the machine and so forming a completely inclosed annular casing containing the stator windings.

Alternatively, I may employ the stator windings carried in closed slots and the interior surface of the stator laminations forming a part of the watertight inclosure for the windings.

The invention consists further in the detailed and constructional improvements hereinafter set forth in this specification and the claims.

The stator windings inclosure would preferably be adapted to allow for any expansion of the insulating liquid under heat. For example, the ends of the inclosing tube or the like would be of suitable corrugated sheet material. The conducting leads would be brought out through special oil tight insulating glands.

The rotor is adapted to run in the center of this annular casing and to be submerged in water.

The shaft bearings are preferably plain bearings lubricated by means of a somewhat viscid lubricant, such, for example, as paraffin jelly or what is known under registered trade mark as "vaseline" preferably subjected to a pressure slightly above that of the external or surrounding medium.

Referring to the drawings, Figure 1 represents a form of inclosure in which an inclosing cylinder of suitable steel is employed.

Fig. 2 is a similar view showing a form in which there is no separate lining cylinder in the air gap.

Referring to Fig. 1 the laminations 1 of the stator together with the windings 2 are inclosed within an annular chamber formed by the casing 3 of the machine and the inclosing tube 4 with a corrugated flanged portion 5 secured at 6 within the joint of the main stator casing and the end frame 7 the farther end of the tube being attached to the corrugated plate similarly secured within the joint between the casing 3 and the end frame 8.

The annular chamber thus formed is filled with non-hygroscopic oil or other suitable insulating fluid.

The rotor 9 runs in bearings 10, 11, which are lubricated in the form shown by means of grease cups 12, 13.

The bearings may moreover be water cooled, thus preventing the lubricating grease from flowing too readily and the design of the machine may vary very considerably without departing from the features wherein this invention consists. As illustrated, the body of the machine is cored out forming an annular chamber 14 surrounding the stator laminations and circulating water may pass up from the inlet 15 at the bottom of this chamber, out at the top where a regulating valve 16 is shown and thence to the chamber 17 cooling the bearing 10 and to the rotor chamber 18 chamber 19 cooling the bearing 11 and to the outlet 20. Such water circulation assists in the cooling of the oil in which the windings are immersed more especially at such times as the motor itself is not submerged.

Referring to Fig. 2, the stator windings 21 are carried in closed slots so that the interior surface of the stator is an unbroken cylinder built up of laminations. This surface may be specially treated with waterproof varnish or other suitable material to prevent the penetration of liquid between the laminæ from the rotor chamber into the slots. To complete the oil chamber and inclose the end windings, bolts 22 are passed through the laminations of the stator and, as illustrated, lie in the ends of the slots. These bolts secure end rings 23, 23 or the like tightly around the inner edge of the stator laminations and the inclosure is completed by the metal end casings 24, 24 welded or otherwise suitably secured to the end rings. The end casings 24, 24 may alternatively be clamped between the end rings and the stator laminations or suitably secured in position by any other means.

What I claim and desire to secure by Letters Patent is:—

1. An induction motor, adapted to be used under water, comprising a stator, with field windings, and a rotor in which the currents are generated by induction from the field, a closed water-tight closure around the windings of the stator, an insulating liquid in said water-tight closure in which said windings are immersed, said rotor being outside said insulating liquid-containing closure, said closure being responsive to pressure whereby substantial equilibrium may be reached between the contained liquid and outside water under the variations of pressure caused by the depth of immersion of the motor and heat of the motor.

2. In a motor of the squirrel-cage induction type, the combination of a rotor, a stator provided with suitable windings, a tube disposed in the air gap and means in conjunction with the tube and stator for completing an inclosure for isolating the stator windings.

3. In a motor of the squirrel-cage induction type, the combination of a rotor, a stator provided with suitable windings, a steel tube disposed in the air gap and means in conjunction with the steel tube and stator for completing an inclosure for isolating the stator windings.

4. In a motor of the squirrel-cage induction type, a laminated stator, said stator having winding channels, windings disposed in said channels, an insulating fluid covering the windings, and means for sealing the laminæ in front of the windings against ingress of water.

In witness whereof I have hereunto signed my name in the presence of two subscribing witnesses.

THOMAS LANCELOT REED COOPER.

Witnesses:
REGINALD EATON ELLIS,
ROBERT MILTON SPEARPOINT.